United States Patent Office 2,981,754
Patented Apr. 25, 1961

2,981,754
PROCESS OF PREPARING 2,2,3,3-TETRACHLORO-1,4-BUTANEDIOL

Robert Walter Wynn, Easton, Pa., assignor to General Aniline & Film Corporation, New York, N.Y., a corporation of Delaware No Drawing. Filed Nov. 23, 1955, Ser. No. 548,769

6 Claims. (Cl. 260—633)

This invention relates to the compound 2,2,3,3-tetrachloro-1,4-butanediol and to a method for preparing same.

Several unsuccessful attempts have in the past been made for the purpose of producing the compound 2,2,3,3-tetrachloro-1,4-butanediol. While 2,3-dibromo-1,4-butenediol has been readily obtained by adding bromine to a benzene suspension of 2-butyne-1,4-diol, neither the dichloro analog nor 2,2,3,3-tetrachloro-1,4-butanediol have been successfully prepared by chlorination of 2-butyne-1,4-diol. Thus, when 2-butyne-1,4-diol was treated with a solution of chlorine in carbon tetrachloride, a black oil formed on the surface of the carbon tetrachloride which proved to be a complex mixture of labile products, each of which on exposure to air, blackened within a few minutes. No definite compound was identified apart from a small quantity of unchanged 2-butyne-1,4-diol.

It is an object of this invention to provide the compound 2,2,3,3-tetrachloro-1,4-butanediol. Another object of this invention is the provision of a process for preparing same. Still another object of this invention is the provision of a process for adding chlorine atoms to the unsaturated linkages in 2-butyne-1,4-diol. Other objects and advantages will appear as the description proceeds.

The attainment of the above objects is made possible by the instant invention which includes a process comprising subjecting 2-butyne-1,4-diol to the action of an amount of gaseous chlorine at least about 25% in excess of that theoretically required to saturate said 2-butyne-1,4-diol, i.e., at least 2.5 moles of chlorine per mole of butynediol in an inert aromatic hydrocarbon liquid medium and in the presence of a weak acid acceptor. It has been found that the process of this invention results in satisfactory yields of the desired 2,2,3,3-tetrachloro-1,4-butanediol. The addition reaction of the chlorine to the 2-butyne-1,4-diol to produce the desired product is thus readily accomplished by way of the intermediate 2,3-dichloro-1,4-butenediol.

As stated above, the liquid medium in which the reaction is carried out is an inert aromatic hydrocarbon, preferably benzene. However, other similar hydrocarbons may be employed, including alkylated benzenes and naphthalenes containing 1 to 4 methyl, ethyl, and/or isopropyl substituents. Sufficient liquid hydrocarbon medium is employed to maintain the reaction medium in the form of a fluid slurry or suspension, both the 2-butyne-1,4-diol and the 2,2,3,3-tetrachloro-1,4-butanediol being substantially insoluble in the medium at the reaction temperatures. Hydrocarbons are employed which are liquid at the reaction temperature of the process and which preferably have boiling points of at least 80° C.

The weak acid acceptor operative in the instant invention is in general a weakly alkaline substance which has been found necessary for obtaining improved yields of the desired product. This substance probably aids in accomplishing the desired result by reducing the tendency towards cyclodehydration of the desired product giving rise to furan derivative by-products, and by binding hydrogen chloride which is produced during the reaction in a manner as yet not understood. While calcium carbonate is the preferred acid acceptor for use in the instant invention, other similar substances may be employed such as the carbonates, bicarbonates, acetates, formates, propionates, and other salts of weak acids with alkali metals and alkaline earth metals such as sodium, potassium, calcium, magnesium, and the like, pyridine, and similar substances. In general, the acid acceptor is employed in amounts ranging from about .05 to .5 mole per mole of 2-butyne-1,4-diol.

As stated above, at least about 25% of gaseous chlorine in excess of that theoretically required to saturate the 2-butyne-1,4-diol is required in order that the reaction proceed in the desired manner for the production of the desired product in improved yields. Lower amounts have been found to yield unsatisfactory results. In general, about a 35 to 70% excess yields optimum results, larger amounts being operative but economically less desirable. The reaction is carried out at temperatures of from about 30 to 70° C., and preferably from about 30 to 50° C. Although other methods of recovering the desired product from the reaction mixture may be employed, it is preferred to heat the slurry resulting from the reaction to elevated temperatures of about 80° C. or more, whereby the 2,2,3,3-tetrachloro-1,4-butanediol dissolves in the hydrocarbon liquid medium and the insoluble materials filtered off. The filtrate may then be cooled and the precipitated desired product filtered off.

The product is useful as a nematocide, mothproofing agent and as the active ingredient in dusting powder (insecticidal) formulations. It is also a valuable intermediate which may be employed for the production of polyesters by reaction with polybasic acids such as adipic, phthalic, maleic, fumaric, chlorendic, or the like, or their halides, esters, nitriles or anhydrides, followed by polymerization of the resulting esters. Such polyesters contain a relatively high proportion of chlorine to which is attributable such properties as flame resistance, biocidal activity, and the like. Such polyesters which are liquid are of interest as cutting oils, in addition to the diesters of the instant product with monobasic acids.

The following example, in which parts are by weight unless otherwise indicated, is illustrative of the instant invention and is not to be regarded as limitative.

*Example*

Into a 1-liter 4-necked flask equipped with stirrer, thermometer, reflux condenser and gas inlet tube is charged 43 g. (0.5 mole) of 2-butyne-1,4-diol, 10 g. of calcium carbonate and 500 cc. of benzene. While stirring, the mixture is heated to 50° C. and at 50±3° C., 75 g. of chlorine gas is bubbled into the mixture in 3 hours. The mixture is then cooled to 30±3° C., and 25 g. of chlorine gas is bubbled into the mixture in 5 hours. (Chlorine theoretically required, 1.0 mole; actual, 1.4 moles.) The mixture is then heated to reflux and the insoluble material filtered off by gravity. The filtrate is cooled to 10° C. and the precipitated product containing 2,2,3,3-tetrachloro-1,4-butanediol is filtered off. The product is yellow in color. Further purification to yield a white crystalline product may be achieved by sublimation and recrystallization from benzene or water.

Yield.—35% of theoretical (40.5 g.)

Analysis.—$C_4H_6O_2Cl_4$:

| | Calc'd | Found |
|---|---|---|
| Percent C | 21.0 | 21.70 |
| Percent H | 2.63 | 2.66 |
| Percent Cl | 62.3 | 62.91; 62.70 |

*Hydroxyl determination.*—Theoretical: 14.92. Found: 14.52.

*Infrared.*—No unsaturation.

In processes wherein only theoretical amounts of chlorine were used (i.e. 2.0 moles of chlorine per mole of butynediol), an intractable material incapable of separation by fractional distillation was produced from which no pure product could be obtained.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A process comprising subjecting 2-butyne-1,4-diol to the action of an amount of gaseous chlorine at least about 25% in excess of that theoretically required to saturate said 2-butyne-1,4-diol, in an inert aromatic hydrocarbon liquid medium and in the presence of a weak acid acceptor.

2. A process comprising subjecting 2-butyne-1,4-diol to the action of an amount of gaseous chlorine at least about 25% in excess of that theoretically required to saturate said 2-buyne-1,4-diol in a benzene medium and in the presence of a weak acid acceptor.

3. A process comprising subjecting 2-butyne-1,4-diol to the action of an amount of gaseous chlorine at least about 25% in excess of that theoretically required to saturate said 2-butyne-1,4-diol in a benzene medium and in the presence of calcium carbonate.

4. A process comprising subjecting 2-butyne-1,4-diol to the action of an amount of gaseous chlorine about 40% in excess of that theoretically required to saturate said 2-butyne-1,4-diol, in an inert aromatic hydrocarbon liquid medium and in he presence of a weak acid acceptor.

5. A process as defined in claim 4 wherein said liquid medium is benzene.

6. A process as defined in claim 5 wherein said acid acceptor is calcium carbonate.

References Cited in the file of this patent

UNITED STATES PATENTS 2,648,702    De Garmo et al.  -------- Aug. 11, 1953